UNITED STATES PATENT OFFICE.

PAUL EHRLICH AND ALFRED BERTHEIM, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

ARSENOBENZENE DERIVATIVES AND PROCESS OF MAKING SAME.

1,017,657.  Specification of Letters Patent.  Patented Feb. 20, 1912.

No Drawing.  Application filed June 12, 1911. Serial No. 632,766.

*To all whom it may concern:*

Be it known that we, PAUL EHRLICH, M. D., professor of medicine, and ALFRED BERTHEIM, Ph. D., citizens of the Empire of Germany, residing at Frankfort-on-the-Main, Germany, have invented certain new and useful Improvements in Arsenobenzene Derivatives and Processes of Making Same, of which the following is a specification.

We have found that asymmetrical arsenobenzene derivatives, containing a salt-forming group of atoms, such as the amino-, hydroxyl-, carboxyl- group, can be obtained. These new products may be produced by treating with strong reducing agents two different aromatic arsenoids, of which at least one contains a salt-forming group of atoms, which are mixed proportionally to their molecular weights. The reaction which takes place corresponds to the equation:

$$R_1-AsO+R_2-AsO+2H_2=$$
$$R_1-As=As-R_2+2H_2O$$

wherein $R_1$ and $R_2$ mean aromatic radicals different from each other and one of them at least containing a group of atoms capable of forming salts. As the arsenoxids are the products formed first from the arsinic acids by the action of reducing agents, the latter may also be used in the present process in the place of the arsenoxids. Suitable reducing agents, are for instance, hydrosulfite, sodium amalgam, stannous chlorid.

The new compounds are yellow to yellowish-brown powders. When heated with tin and hydrochloric acid they are split up with formation of two aromatic arsins differing from each other. They decompose when heated and are easily altered when exposed to the air, particularly in presence of alkalis. They are soluble in glacial acetic acid and concentrated sulfuric acid and are of great therapeutical value owing to their bactericidal action upon trypanosomes.

For preparing an asymmetrical arsenobenzene the procedure may, for instance, be as follows: The chlorhydrate of the phenyl-glycinarsin-dichlorid

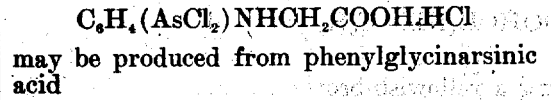

may be produced from phenylglycinarsinic acid

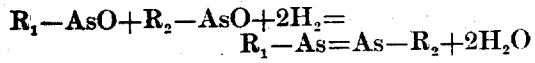

in a hydrochloric acid (specific gravity 1.19) solution by the action of sulfurous acid in presence of a small quantity of hydriodic acid acting as catalyzer. This phenylglycinarsin-dichlorid readily dissolves in alkalis forming the corresponding phenylglycin-arsenoxid. Therefore 41.6 gr. of the chlorhydrate of the phenylglycin-arsin-dichlorid and 24.9 gr. of 3-amino-4-oxybenzenearsenoxid are dissolved in 200 ccm. of methyl alcohol and this solution is poured into 500 ccm. of normal caustic soda lye. After having diluted the mass with 2 liters of water, 200 gr. of anhydrous sodium hydrosulfite are added to it while well stirring. The previously clear liquid then changes to a thick yellowish-brown magma of the arseno compound. After having stirred for about half an hour, the precipitate is filtered off, washed with water and dried in vacuo.

The new phenylglycin-arseno-3-amino-4-oxybenzene

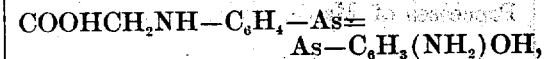

is a yellowish-brown powder, insoluble in water, soluble in glacial acetic acid and in concentrated sulfuric acid, also soluble in diluted hydrochloric acid as well as in caustic soda lye or soda solution with formation of salts. The compound is altered when heated and by being exposed to the air; when heated with tin and hydrochloric acid it is split up with formation of phenylglycinarsin and aminooxybenzenearsin; it has a bactericidal action upon trypanosomes.

Having now described our invention what we claim is:

1. As new products, the asymmetrical arsenobenzene derivatives containing a salt-forming group of atoms; being yellow to yellowish-brown powders soluble in glacial acetic acid and concentrated sulfuric acid, readily altering when heated and exposed to the air, particularly in presence of alkalis, and, when heated with tin and hydrochloric acid, being split up with formation of two aromatic arsins; having a bactericidal action in trypanosomes infections.

2. As a new product, the asymmetrical arsenobenzene derivative, namely the phenylglycin-arseno-3-amino-4-oxybenzene of the formula $$COOHCH_2NH-C_6H_4-As=As-C_6H_3(NH_2)OH;$$

being a yellowish-brown powder, soluble in concentrated sulfuric acid and glacial acetic acid, insoluble in water, easily altering when heated, or when exposed to the air, particularly in an alkaline solution, and when heated with tin and hydrochloric acid being split up with formation of phenylglycin-arsin and aminooxybenzene-arsin; said product forming when treated with diluted hydrochloric acid and with alkalis, salts which are readily soluble in water; producing a curative effect in diseases caused by trypanosomes.

3. The process of producing asymmetrical arsenobenzene derivatives, which consists in treating with strong reducing agents two aromatic arsenoxids mixed in molecular proportions and of which at least one contains a salt-forming group of atoms.

4. The process of producing asymetrical arsenobenzene derivatives, which consists in treating with strong reducing agents two aromatic arsenoxids mixed proportionally to their molecular weights, one of which is an aminooxyarsenoxid.

5. The process of producing asymmetrical arsenobenzene derivatives, which consists in treating with hydrosulfite two aromatic arsenoxids mixed proportionally to their molecular weights and of which at least one contains a salt-forming group of atoms.

6. The process of producing an asymmetrical arsenobenzene derivative, which consists in treating with hydrosulfite the phenylglycinarsenoxid.

$$C_6H_4(4)NHCH_2COOH(1)AsO,$$

and the aminooxybenzenearsenoxid.

$$C_6H_3(3)NH_2(4)OH(1)AsO,$$

mixed proportionally to their molecular weights.

In testimony whereof, we affix our signatures in presence of two witnesses.

PAUL EHRLICH.
ALFRED BERTHEIM.

Witnesses:
 JEAN GRUND,
 CARL GRUND.

---

It is hereby certified that in Letters Patent No. 1,017,657, granted February 20, 1912, upon the application of Paul Ehrlich and Alfred Bertheim, of Frankfort-on-the-Main, Germany, for an improvement in "Arsenobenzene Derivatives and Processes of Making Same," an error appears in the printed specification requiring correction as follows: Page 1, line 17, for the word "arsenoids" read *arsenoxids;* and that the said Letters Patent should be read with this correction therein that the same may conform to the record of the case in the Patent Office.

Signed and sealed this 11th day of June, A. D., 1912.

[SEAL.]

C. C. BILLINGS,
*Acting Commissioner of Patents.* arsenobenzene derivatives containing a salt-forming group of atoms; being yellow to yellowish-brown powders soluble in glacial acetic acid and concentrated sulfuric acid, readily altering when heated and exposed to the air, particularly in presence of alkalis, and, when heated with tin and hydrochloric acid, being split up with formation of two aromatic arsins; having a bactericidal action in trypanosomes infections.

2. As a new product, the asymmetrical arsenobenzene derivative, namely the phenylglycin-arseno-3-amino-4-oxybenzene of the formula $$COOHCH_2NH-C_6H_4-As=As-C_6H_3(NH_2)OH;$$

being a yellowish-brown powder, soluble in concentrated sulfuric acid and glacial acetic acid, insoluble in water, easily altering when heated, or when exposed to the air, particularly in an alkaline solution, and when heated with tin and hydrochloric acid being split up with formation of phenylglycin-arsin and aminooxybenzene-arsin; said product forming when treated with diluted hydrochloric acid and with alkalis, salts which are readily soluble in water; producing a curative effect in diseases caused by trypanosomes.

3. The process of producing asymmetrical arsenobenzene derivatives, which consists in treating with strong reducing agents two aromatic arsenoxids mixed in molecular proportions and of which at least one contains a salt-forming group of atoms.

4. The process of producing asymetrical arsenobenzene derivatives, which consists in treating with strong reducing agents two aromatic arsenoxids mixed proportionally to their molecular weights, one of which is an aminooxyarsenoxid.

5. The process of producing asymmetrical arsenobenzene derivatives, which consists in treating with hydrosulfite two aromatic arsenoxids mixed proportionally to their molecular weights and of which at least one contains a salt-forming group of atoms.

6. The process of producing an asymmetrical arsenobenzene derivative, which consists in treating with hydrosulfite the phenylglycinarsenoxid.

$$C_6H_4(4)NHCH_2COOH(1)AsO,$$

and the aminooxybenzenearsenoxid.

$$C_6H_3(3)NH_2(4)OH(1)AsO,$$

mixed proportionally to their molecular weights.

In testimony whereof, we affix our signatures in presence of two witnesses.

PAUL EHRLICH.
ALFRED BERTHEIM.

Witnesses:
 JEAN GRUND,
 CARL GRUND.

---

It is hereby certified that in Letters Patent No. 1,017,657, granted February 20, 1912, upon the application of Paul Ehrlich and Alfred Bertheim, of Frankfort-on-the-Main, Germany, for an improvement in "Arsenobenzene Derivatives and Processes of Making Same," an error appears in the printed specification requiring correction as follows: Page 1, line 17, for the word "arsenoids" read *arsenoxids;* and that the said Letters Patent should be read with this correction therein that the same may conform to the record of the case in the Patent Office.

Signed and sealed this 11th day of June, A. D., 1912.

[SEAL.]

C. C. BILLINGS,
*Acting Commissioner of Patents.*

It is hereby certified that in Letters Patent No. 1,017,657, granted February 20, 1912, upon the application of Paul Ehrlich and Alfred Bertheim, of Frankfort-on-the-Main, Germany, for an improvement in "Arsenobenzene Derivatives and Processes of Making Same," an error appears in the printed specification requiring correction as follows: Page 1, line 17, for the word "arsenoids" read *arsenoxids;* and that the said Letters Patent should be read with this correction therein that the same may conform to the record of the case in the Patent Office.

Signed and sealed this 11th day of June, A. D., 1912.

[SEAL.]

C. C. BILLINGS,
*Acting Commissioner of Patents.*